Feb. 18, 1969   E. STEINGROEVER   3,428,370
MAGNETIC SUSPENSION SYSTEM
Filed Oct. 22, 1965   Sheet 1 of 2

United States Patent Office 3,428,370
Patented Feb. 18, 1969

3,428,370
MAGNETIC SUSPENSION SYSTEM
Erich Steingroever, Bonn, Germany, assignor to Magnetfabrik Bonn G.m.b.H. vorm. Gewerkschaft Windhorst, Bonn, Germany
Continuation-in-part of application Ser. No. 287,586, June 13, 1963. This application Oct. 22, 1965, Ser. No. 502,207
Claims priority, application Germany, June 16, 1962, M 53,228
U.S. Cl. 308—10                18 Claims
Int. Cl. F16c 39/06, 35/00

ABSTRACT OF THE DISCLOSURE

A magnetic suspension system wherein a rotatable armature is attached to a ring of diamagnetic material that is disposed in the annular gap defined by opposite poles of an annular magnet body.

---

This application is a continuation-in-part of application Ser. No. 287,586, filed June 13, 1963, for Magnetic Suspension System, now abandoned.

This invention relates to a magnetic suspension system particularly suitable for the frictionless floating support of the armature of an electric meter or counter or the like.

Many constructions are known for supporting an electrically conductive disc on the principle of a magnetic flux field repelling the magnetic material in the disc which repulsion force supports the rotor. In such constructions, the magnetic support can be arranged to provide stability in either the axial direction or in the radial direction. It has not been possible to provide a stable solely magnetic support in both directions. If such attempts were made, objectionable torques could not be avoided, and as a rule, some mechanical centering means has been applied.

On the other hand, it has been known that diamagnetic bodies are capable of floating freely in a static magnetic field in a stable equilibrium (W. Braunbeck Z. fur Physik, 1939, pp. 753–769). Suitable materials having high negative susceptibility are carbon and bismuth. It has also been proposed to construct a rotary system for electric counters in such a way that a main portion of the weight is supported by the repelling force of a stationary permanent magnet or one or more magnets carried by said rotary system; a small portion of the weight is carried by a diamagnetic cylindrical ring which enters into the inhomogeneous field of the gap of another stationary magnet and serves as support for the shaft of the movable system.

According to the invention, a completely free floating armature supported solely by a static magnetic field is used. Said armature consists of a diamagnetic ring which floats in the inhomogeneous field of a ring gap magnet and which may be provided with an electrically conducting driving part in the form of a disc, ring, or cylinder.

In order to avoid any mechanical contact of the armature, its revolutions are preferably counted by photoelectric, capacitative, or inductive means which are well known to the art.

It has, however, not yet been possible to build a stable magnetic suspension system where the total magnetic suspension was furnished by magnetic repulsion forces.

It is, therefore, a principal object of the invention to provide a stable magnetic suspension which at the same time supports as well as centers a body suspended or rotation.

Other objects and advantages will become apparent from a consideration of the specification and claims.

For a better understanding of the invention, reference is made in the following description to the accompanying drawings wherein FIG. 1 is a cross-sectional view of the rotor of an electric meter magnetically supported in stable centered floating position;

Figure 1:
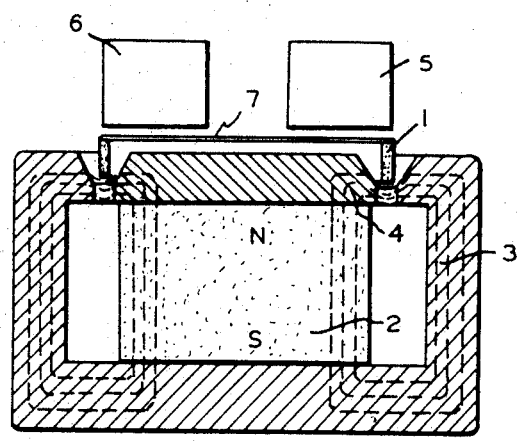
Figure 7:
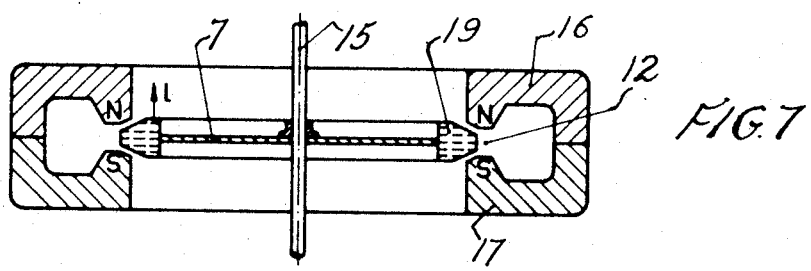

FIG. 7 is a cross-sectional view of another embodiment of an electric counter using a magnetic suspension in accordance with the invention, and In the drawings, the numeral 1 designates a ring of diamagnetic material, e.g., bismuth, carbon or graphite, which floats completely freely in the field of a ring gap magnet system. Said system consists of a permanent magnet 2 with the poles N and S, the iron pot-shaped iron return member 3 and the pole plate 4. The directing of the magnetic flux through the member, the plate and across the gap is represented by broken lines in FIG. 1. The ring armature 1 is driven by a conventional drive system 5 or by several such drive systems 5 and 6, whereby the alternating magnetic flux of the one or other drive system may be passed partially through the iron parts of the permanent magnet system. The load bearing capacity of the floating ring armature is utilized for carrying a driven part 7 preferably of an electrically conducting material such as aluminum. It is of advantage to have the driving mechanisms act on said conducting part.

It is to be understood that the support flux for the rotor is produced solely by the field between members 4 and 3, whereby the flux density of said field should be at least 5000 gausses, whereas the magnetic system 5, 6 produces the flux proportionally to the load to be measured and imparts rotation to the rotor.

Figure 2:
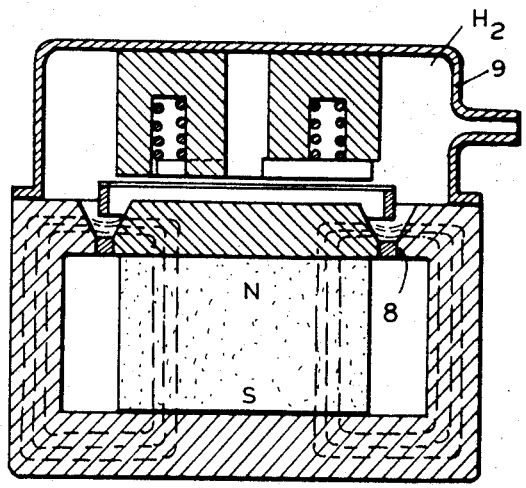
FIG. 2 is a similar view wherein the rotor and a rotation-symmetric driving system for the rotor are enclosed.

In order to eliminate air friction, the rotary system may run in vacuum or in a gas of low viscosity, e.g., $H_2$. In such a case, as shown in FIG. 2, the air gap of the magnet system is closed by a ring 8 and covered by a cap 9, which both may consist of brass or a similar material. In FIG. 2, there is also shown diagrammatically a rotation-symmetric driving system with pot-shaped iron return path 3, which is particularly suitable for driving the armature of the invention.

As long as the ring or disc armature rotates centrically in the radial symmetric field of the annular gap, there is no retarding torque acting on the driven disc 7 by eddy currents because all the induced potential vectors are directed radially outwardly. If the symmetry is disrupted by one or more slots or recesses in the poles of the magnet system, eddy currents develop which produce on the rotary system a braking torque which is a function of the angular velocity, whereby the desired integration of the electric power is produced in known manner.

Figure 3:
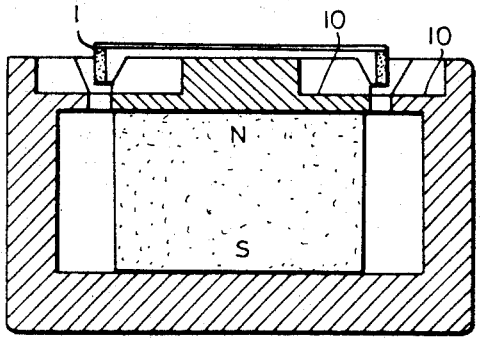
FIGS. 3 and 4 show in cross-section and plan view a system similar to that of FIG. 1 with grooves in the poles whose function will be explained below.
Figure 4:
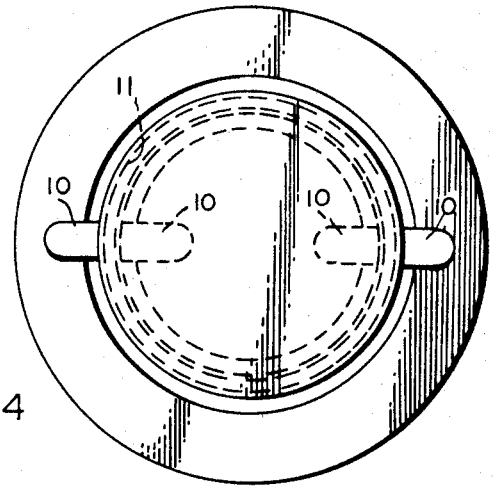
Figure 5:
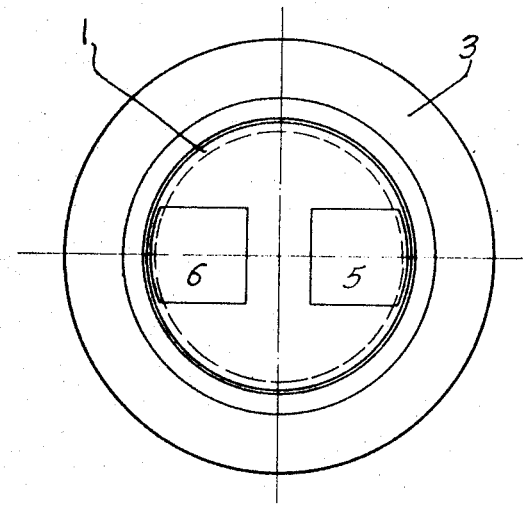
FIG. 5 is a top view of the system of FIG. 1.

FIGS. 3 and 4 show such an arrangement where the magnet field is inhomogeneous at the points 10 by means of grooves in the iron poles so that electric eddy currents may be formed and brake the rotary system 11 as a function of the velocity. It is of advantage to arrange said grooves symmetrically to each other so that lateral forces compensate each other as will be seen from viewing FIG. 4, which is a top view of the arrangement shown in FIG. 3. In lieu of the grooves, projections or other deformations in the poles may be formed along the surface of the pole pieces to render the magnetic field inhomogeneous at selected places.

Figure 6:
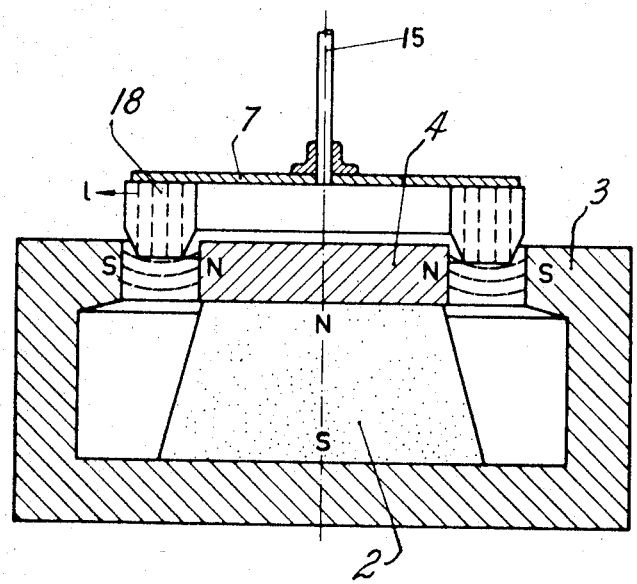
FIG. 6 is a cross-sectional view of the magnetic suspension of an electric counter in accordance with the invention.

In a preferred embodiment of the invention as shown in FIG. 6, the diamagnetic ring 18 consists of an upper cylindrical part, e.g., of quadrangular cross section, and a lower tapering part of trapezoidal cross section which lower part enters the air gap. This shape allows the ring to enter the air gap more or less deeply in accordance with the load.

FIG. 7 shows a construction where the air gap 12 is provided between vertically spaced poles 16 and 17, therefore, the diamagnetic ring 19 has horizontally tapering ends entering the gap. Here again, the outer rim of the ring may have a trapezoidal or other suitable tapering cross section.

In both modifications shown in FIG. 6 and 7, the diamagnetic ring 1 supports a light non-magnetic ring 7 connected to a shaft 15.

Finally, it is of advantage to make the diamagnetic ring of graphite crystals whose hexagonal axes extend either radially in the plane of the ring (indicated by the arrow "1" in FIG. 6) or normally to the plane of the ring (indicated by the arrow "1" in FIG. 7); in other words, the hexagonal axes of the graphite should extend in the direction of the magnetic flux between the N and S poles of the magnet supporting the ring. Such arrangement of the crystal axes increases the load bearing and centering properties of the diamagnetic ring and is described in more detail in my copending application Ser. No. 498,542 for "Diamagnetic Body," filed Oct. 20, 1965.

I claim:

1. A magnetic suspension system comprising a pair of annular poles facing each other across an air gap and producing a magnetic field in and around said gap, magnet means energizing said poles, a diamagnetic ring at least partially in said inhomogeneous field, said ring being maintained in floating centered suspension by the magnetic repulsion exerted thereon.

2. A magnetic system as claimed in claim 1 comprising an electrical armature element carried by said ring cooperating with alternating current flux producing elements for rotation of said ring.

3. The magnetic system as claimed in claim 2 comprising means rendering said magnetic field inhomogeneous at its periphery, thereby producing braking of the armature element by eddy currents.

4. The magnetic system as claimed in claim 3 wherein said means are symmetrically arranged.

5. The magnetic system as claimed in claim 3 wherein said means are recesses.

6. The magnetic system as claimed in claim 3 wherein said means are slots.

7. The magnetic system as claimed in claim 3 wherein said means are projections.

8. The magnetic system as claimed in claim 2 wherein said armature element is disposed in a space sealed against the atmosphere.

9. The magnetic system as claimed in claim 8 wherein said sealed space is evacuated.

10. The magnetic system as claimed in claim 8 wherein said sealed space is filled with a gas of low friction.

11. The magnetic system as claimed in claim 10 wherein said sealed space is filled with hydrogen.

12. The magnetic system as claimed in claim 1 wherein said magnet means comprises a rotation-symmetric driving system providing a pot-shaped iron return path.

13. The magnetic system as claimed in claim 1 wherein said poles are disposed in a horizontal plane in radially spaced relationship.

14. The magnetic system as claimed in claim 13 wherein said ring has a quadrangular cross section and a downwardly tapering rim entering said air gap.

15. The magnetic system as claimed in claim 1 wherein said poles are disposed in a vertical plane in vertical spaced relationship.

16. The magnetic system as claimed in claim 15 wherein said ring has a quadrangular cross section and an outwardly tapering rim.

17. The magnetic system as claimed in claim 1 wherein said magnet means is a permanent magnet.

18. The magnetic system as claimed in claim 1 wherein said magnet means is an electro-magnet.

References Cited

UNITED STATES PATENTS

| | | | |
|---|---|---|---|
| 3,026,151 | 3/1962 | Buchhold | 308—10 |
| 3,243,238 | 3/1966 | Lyman | 308—10 |
| 3,356,425 | 12/1967 | Carriere et al. | 308—10 |

MILTON O. HIRSHFIELD, *Primary Examiner.*

L. L. SMITH, *Assistant Examiner.*